(12) United States Patent
Huang et al.

(10) Patent No.: US 9,017,872 B2
(45) Date of Patent: Apr. 28, 2015

(54) LITHIUM TITANATE COMPOSITE MATERIAL, METHOD FOR MAKING THE SAME, AND LITHIUM ION BATTERY USING THE SAME

(75) Inventors: Xian-Kun Huang, Beijing (CN); Xiang-Ming He, Beijing (CN); Chang-Yin Jiang, Beijing (CN); Dan Wang, Beijing (CN); Jian Gao, Beijing (CN); Jian-Jun Li, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 918 days.

(21) Appl. No.: 13/099,382

(22) Filed: May 3, 2011

(65) Prior Publication Data

US 2012/0164535 A1    Jun. 28, 2012

(30) Foreign Application Priority Data

Dec. 28, 2010  (CN) .......................... 2010 1 0609702

(51) Int. Cl.
*H01M 4/1391* (2010.01)
*H01M 4/485* (2010.01)
*H01M 4/62* (2006.01)
*H01M 4/36* (2006.01)

(52) U.S. Cl.
CPC .............. *H01M 4/485* (2013.01); *H01M 4/366* (2013.01); *H01M 4/62* (2013.01); *H01M 4/625* (2013.01); *Y02E 60/122* (2013.01)

(58) Field of Classification Search
USPC ....................................................... 429/231.1
See application file for complete search history.

(56) References Cited

U.S. PATENT DOCUMENTS

| 7,326,498 | B2 | 2/2008 | Park et al. | |
|---|---|---|---|---|
| 8,277,979 | B2 * | 10/2012 | Huang et al. | 429/231.5 |
| 2005/0118511 | A1 * | 6/2005 | Park et al. | 429/324 |
| 2007/0148545 | A1 * | 6/2007 | Amine et al. | 429/231.1 |
| 2008/0285211 | A1 * | 11/2008 | Zaghib et al. | 361/528 |
| 2010/0323118 | A1 * | 12/2010 | Mohanty et al. | 427/447 |
| 2011/0104553 | A1 * | 5/2011 | Pol et al. | 429/156 |
| 2012/0088160 | A1 * | 4/2012 | Zhang et al. | 429/328 |

FOREIGN PATENT DOCUMENTS

| CN | 1416189 | 5/2003 |
|---|---|---|
| CN | 101150190 | 3/2008 |
| CN | 101378119 | 3/2009 |
| CN | 101764209 | 6/2010 |

OTHER PUBLICATIONS

J.Cho "Correlation between AlPO4 nanoparticle coating thickness on LiCoO2 cathode and thermal stablility", Electrochimica Acta, 48 (2003), 2807-2811.

* cited by examiner

*Primary Examiner* — Patrick Ryan
*Assistant Examiner* — Lucas J O'Donnell
(74) *Attorney, Agent, or Firm* — Novak Druce Connolly Bove + Quigg LLP

(57) ABSTRACT

A lithium titanate composite material includes lithium titanate particles and an AlPO4/C composite layer disposed on a surface of the lithium titanate particles. The AlPO$_4$/C composite layer includes aluminum phosphate and carbon. The lithium titanate composite material, as an anode active material, can be applied to a lithium ion battery to increase its electrochemical stability.

12 Claims, 2 Drawing Sheets

US 9,017,872 B2

LITHIUM TITANATE COMPOSITE MATERIAL, METHOD FOR MAKING THE SAME, AND LITHIUM ION BATTERY USING THE SAME

CROSS-REFERENCE TO RELATED APPLICATIONS

This application claims all benefits accruing under 35 U.S.C. §119 from China Patent Application No. 201010609702.1, filed on Dec. 28, 2010, in the China Intellectual Property Office, the contents of which are hereby incorporated by reference. This application is related to commonly-assigned applications entitled, "LITHIUM TITANATE COMPOSITE MATERIAL, METHOD FOR MAKING THE SAME, AND LITHIUM ION BATTERY USING THE SAME", Ser. No. 13,099,383, "METHOD FOR MAKING ELECTRODE COMPOSITE MATERIAL", Ser. No. 13,097,406; "ELECTRODE COMPOSITE MATERIAL AND LITHIUM ION BATTERY USING THE SAME", Ser. No. 13,097,397, "ELECTRODE COMPOSITE MATERIAL, METHOD FOR MAKING THE SAME, AND LITHIUM ION BATTERY USING THE SAME", filed on Apr. 21, 2011, application Ser. No. 13/032776.

BACKGROUND

1. Technical Field

The present disclosure relates to a lithium titanate based electrode active material having a composite layer, a method for making the same, and a lithium ion battery having the same.

2. Description of Related Art

Spinel typed lithium titanate (e.g., $Li_4Ti_5O_{12}$), as a "zero strain" material used in the anode electrode of lithium ion battery, exhibits a high diffusion rate of lithium ions. Furthermore, there is no formation of solid electrolyte interface films during first charge-discharge process.

Lithium titanate is a semiconductor material having poor electric conductivity. A lithium ion battery having lithium titanate as its anode active material has a relatively high discharge voltage plateau. When the lithium ion battery is discharged to a low voltage, electrolytes of the lithium ion battery can easily decompose at the anode. The decomposition of the electrolytes results in a decrease of electrochemical stability of the lithium ion battery.

What is needed, therefore, is to provide a lithium titanate composite material used as an anode active material having good electric conductivity and electrochemical stability, a method for making the same, and a lithium ion battery using the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings. It should be noted that references to "another," "an," or "one" embodiment in this disclosure are not necessarily to the same embodiment, and such references mean at least one.

Figure 1:
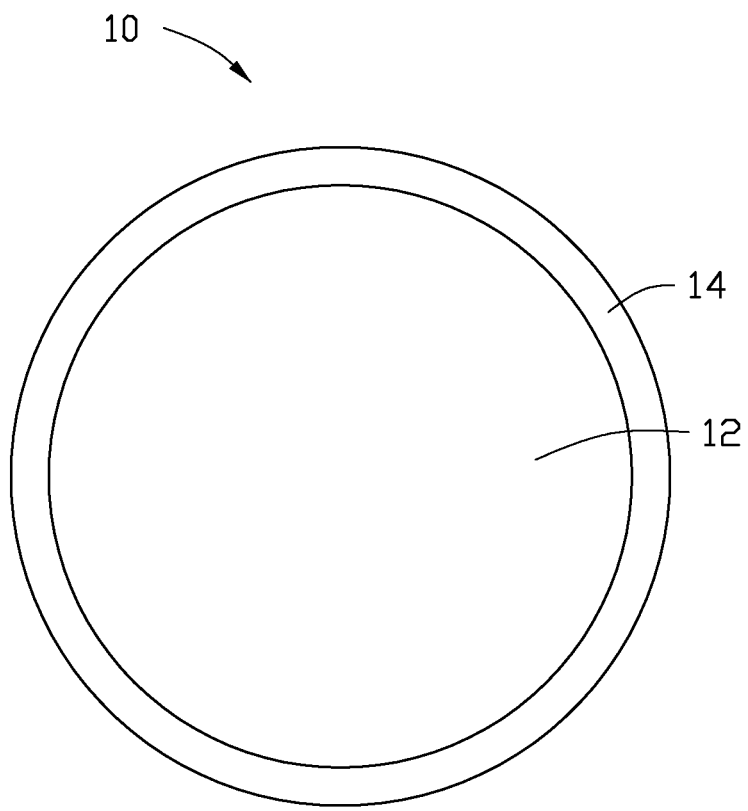
FIG. 1 is a structural schematic view of an embodiment of a lithium titanate composite material.

Referring to FIG. 1, one embodiment of a lithium titanate composite material 10 includes a plurality of lithium titanate particles 12, and an aluminum phosphate/carbon ($AlPO_4$/C) composite layer 14 disposed on a surface of the lithium titanate particles 12.

A material of the $AlPO_4$/C composite layer 14 includes a homogeneous mixture of aluminum phosphate ($AlPO_4$) and carbon. The carbon can be a conductive simple substance of carbon, such as amorphous carbon, graphite, carbon black, acetylene black, or any combination thereof.

The $AlPO_4$/C composite layer 14 can have a substantially uniform thickness, and appears as a continuous material layer. The $AlPO_4$/C composite layer 14 may be entirely coated on the surface of the single lithium titanate particle 12. In one embodiment, each of the electrode active material particles 12 has the $AlPO_4$/C composite layer 14 coated on the surface thereof. A thickness of the $AlPO_4$/C composite layer 14 can be in a range from about 5 nanometers (nm) to about 20 nm. In one embodiment, the thickness of the $AlPO_4$/C composite layer 14 is in a range from about 5 nm to about 10 nm. A mass percentage of the $AlPO_4$/C composite layer 14 to the lithium titanate composite material 10 can be in a range from about 1 wt % to about 5 wt %. A mass percentage of the carbon in the $AlPO_4$/C composite layer 14 to the lithium titanate composite material 10 can be in a range from about 0.7 wt % to about 4 wt %.

A material of the lithium titanate particles 12 can be doped or undoped spinel typed lithium titanate. A chemical formula of the undoped spinel typed lithium titanate can be $Li_4Ti_5O_{12}$. A chemical formula of the doped typed lithium titanate can be $Li_{(4-g)}M_gTi_5O_{12}$ or $Li_4M_hTi_{(5-h)}O_{12}$, wherein $0 \leq g \leq 0.33$ and $0 \leq h \leq 0.5$. In the formula, M represents at least one chemical element of alkali metal elements, alkaline-earth metal elements, Group-13 elements, Group-14 elements, transition metal elements, and rare-earth elements. In one embodiment, M represents at least one chemical element of Mn, Ni, Cr, Co, V, Ti, Al, Fe, Ga, Nd and Mg. A diameter of the lithium titanate particles 12 can be in a range from about 80 nm to about 50 microns. Alternatively, the diameter of the lithium titanate particles 12 can be in a range from about 100 nm to about 20 microns.

Figure 2:
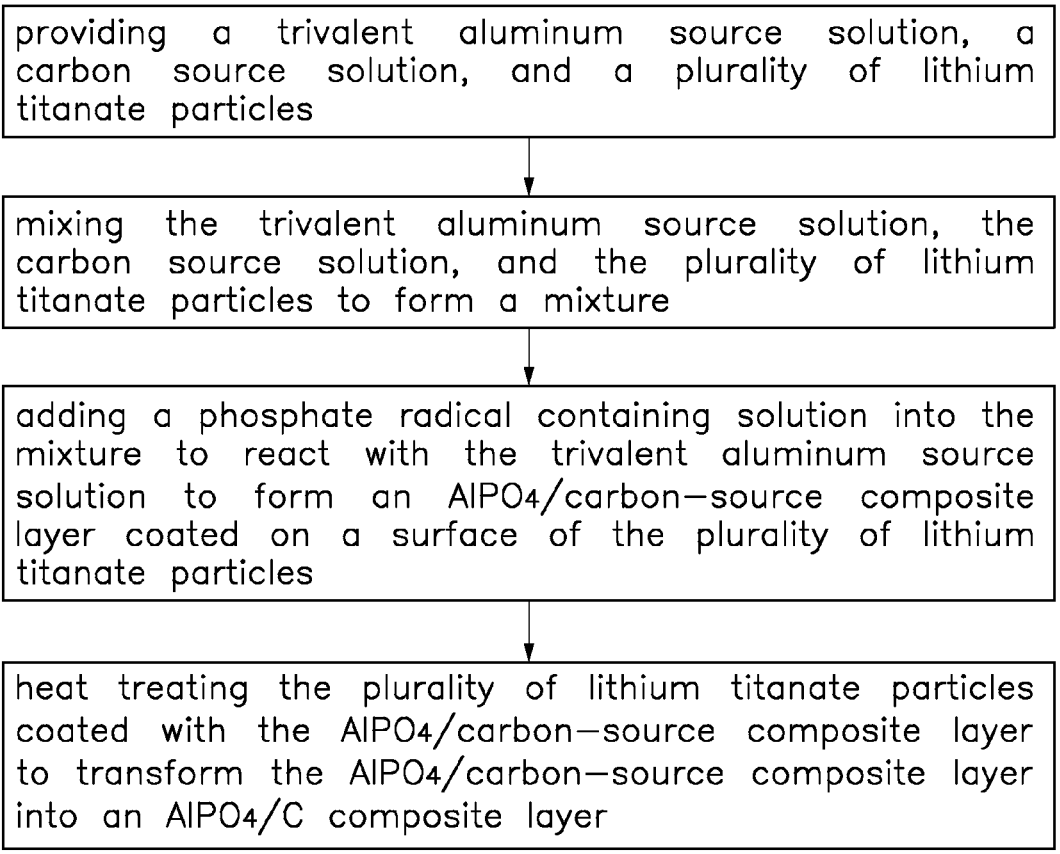
FIG. 2 is a flow chart of an embodiment of a method for making the lithium titanate composite material.

Referring to FIG. 2, one embodiment of a method for making the lithium titanate composite material 10 includes the following steps:

S1, providing a trivalent aluminum source solution, a carbon source solution, and the lithium titanate particles 12;

S2, mixing the trivalent aluminum source solution, the carbon source solution, and the lithium titanate particles 12 to form a mixture;

S3, adding a phosphate radical containing solution to the mixture to react with the trivalent aluminum source solution to form a $AlPO_4$/carbon-source composite layer coated on a surface of the lithium titanate particles 12; and S4, heat treating the lithium titanate particles 12 coated with the $AlPO_4$/carbon-source composite layer to transform the $AlPO_4$/carbon source composite layer into the $AlPO_4$/C composite layer 14.

The phosphate radical containing solution includes a solvent and a phosphate radical source dissolved in the solvent. The trivalent aluminum source in the trivalent aluminum source solution and the phosphate radical source should meet the following conditions: (a) both the trivalent aluminum source and the phosphate radical source are soluble in a liquid solvent; (b) the trivalent aluminum source can react with the phosphate radical source to form $AlPO_4$; and (c) other products except the $AlPO_4$ of the reaction between the trivalent aluminum source and the phosphate radical source can be removed by a heating step.

In step S1, the carbon source solution includes a first amount of liquid phase solvent and a carbon source dissolved in the first amount of liquid phase solvent. The first amount of liquid phase solvent can be water or organic liquid phase solvent. In one embodiment, the first amount of organic liquid phase solvent volatizes easily, and can be at least one of absolute ethanol, acetone, chloroform, diethyl ether, and dichloromethane. Water absorption of the lithium titanate particles 12 may deteriorate the lithium titanate particles 12. Compared with using water, using the first amount of organic liquid phase solvent as the first amount of liquid phase solvent can prevent deterioration of the performance of the lithium titanate particles 12. In one embodiment, the first amount of liquid phase solvent is absolute ethanol.

The carbon source can thermally crack into simple substance of carbon below 700° C. by heating at the temperature, there are no other solid phase substances left except the simple substance of carbon. The carbon source can be an organic surfactant, such as Span® 80 ($C_{24}H_{44}O_6$) or sucrose ester. Span® 80 is sorbitan oleate or sorbitan (Z)-mono-9-octadecenoate. A function of surface activating of the surfactant can effectively reduce the surface tension of the lithium titanate particles 12. Therefore, the surfactant is apt to be absorbed on the surfaces of the lithium titanate particles 12 as a film to coat the lithium titanate particles 12 entirely. The carbon source can also be phenolic resin, epoxy resin, furan resin, polyacrylonitrile, polystyrene naphthalene, or any combination thereof. In one embodiment, the Span® 80 is used as the carbon source. The concentration of the carbon source in the carbon source solution should not be too high or too low. The high concentration of the carbon source may result in an uneven mixing with the lithium titanate particles 12. The low concentration of the carbon source may result in an obvious phase separation with the lithium titanate particles 12. The concentration of carbon source in the carbon source solution can be in a range from about 0.005 grams per milliliter (g/ml) to about 0.05 g/ml. In one embodiment, the concentration of the Span® 80 ethanol solution used is about 0.01 g/ml.

The trivalent aluminum source solution includes a second amount of liquid phase solvent and a trivalent aluminum source dissolved in the second amount of liquid phase solvent. The trivalent aluminum source and the second amount of liquid phase solvent can be mutually soluble. Aluminum ions ($Al^{3+}$) can be dissociated from the trivalent aluminum source in the second amount of liquid phase solvent. The second amount of liquid phase solvent can be water or an organic liquid phase solvent. In one embodiment, the second amount of organic liquid phase solvent volatizes easily, and can be at least one of absolute ethanol, acetone, chloroform, diethyl ether, and dichloromethane. Water absorption of the lithium titanate particles 12 may deteriorate the lithium titanate particles 12. Compared with using water, using the second amount of organic liquid phase solvent as the second amount of liquid phase solvent can prevent deterioration of the performance of the lithium titanate particles 12. The trivalent aluminum source can be aluminum nitrate ($Al(NO_3)_3$) or aluminum isopropoxide ($C_9H_{21}AlO_3$). In one embodiment, the trivalent aluminum source solution is a solution of $Al(NO_3)_3$ dissolved in ethanol.

In step S2, the trivalent aluminum source solution, the carbon source solution, and the lithium titanate particles 12 can be mixed at the same time or one by one. In one embodiment, the mixing step S2 includes the steps of: mixing the carbon source solution with the trivalent aluminum source solution to form an evenly mixed solution, and adding the lithium titanate particles 12 into the mixed solution to form the mixture. The mixture is a solid-liquid mixture, wherein the lithium titanate particles 12 are insoluble in the mixed solution. In the mixture, the $Al^{3+}$ or the trivalent aluminum source existed as molecules, and carbon source molecules are uniformly adhered to the surface of the lithium titanate particles 12.

The step S2 can further include a step of adjusting amounts of the trivalent aluminum source solution, the carbon source solution, and the lithium titanate particles 12 to form a pasty mixture. Amounts of the mixed solution in the pasty mixture is only enough to cover the entire surface of each of the lithium titanate particles 12. A relationship between the amounts of the trivalent aluminum source solution, the carbon source solution, and the lithium titanate particles 12 can be represented by an equation of $1:30 \leq (V_{Al-source} + V_{C-solution}):V_{Li4Ti5O12} \leq 1:10$, wherein $V_{Al-source}$ represents a volume of the trivalent aluminum source solution, $V_{C-solution}$ represents a volume of the carbon source solution, $V_{Li4Ti5O12}$ represents a volume of the lithium titanate particles 12. The amount of the trivalent aluminum source and the carbon source can be determined by the amount of $AlPO_4$ and carbon required in the lithium titanate composite material 10. The amount of the $AlPO_4$ can be in a range from about 0.05 wt % to about 1 wt % by mass of the total amount of the lithium titanate composite material 10, and a mass percentage of the carbon to the lithium titanate composite material 10 can be in a range from about 0.7 wt % to about 4 wt %. The pasty mixture not only insures a thin covering layer of the mixed solution formed on the surface of the lithium titanate particles 12, but also can tightly combine the formed $AlPO_4/C$ composite layer 14 with the surface of the lithium titanate particles 12. The volatile organic liquid phase solvent can be the same as the solvent of the carbon source solution or the solvent of the trivalent aluminum source solution. The first or second amount of organic liquid phase solvent can be added with the lithium titanate particles 12 into the mixed solution to provide enough solvent to form the pasty mixture. In one embodiment, absolute ethanol is added with the lithium titanate particles 12 to form the pasty mixture.

The step S2 can further include a step of stirring the mixture to evenly mix the carbon source solution, the trivalent aluminum source solution, and the lithium titanate particles 12 together. In one embodiment, the mixture is stirred for about 20 to about 40 minutes.

In step S3, the solvent of the phosphate radical containing solution can be water. The phosphate radical in the phosphate radical source can be orthophosphoric radical ($PO_4^{3-}$), dihydrogen phosphate radical ($H_2PO_4^-$), hydrophosphate radical ($HPO_4^{2-}$), or any combination thereof. The phosphate radical source can be phosphoric acid ($H_3PO_4$) or ammonium phosphate salts. The ammonium phosphate salts can be at least one of triammonium phosphate (($NH_4$)$_3PO_4$), ammonium dihydrogen phosphate ($NH_4H_2PO_4$), and diammonium hydrogen phosphate (($NH_4$)$_2HPO_4$). An amount of the water in the phosphate radical containing solution can be as few as possible to have the phosphate radical source totally dissolved therein. A concentration of the phosphate radical containing solution can be in a range from about 0.2 g/ml to about 1 g/ml. In one embodiment, the phosphate radical source is $(NH_4)_2HPO_4$, the concentration of the water solution of $(NH_4)_2HPO_4$ is about 0.4 g/ml.

When the phosphate radical containing solution is added to the pasty mixture, the phosphate radicals react with $Al^{3+}$ or trivalent aluminum molecules adhered on the surface of the lithium titanate particles 12, and in-situ form $AlPO_4$ on the surface of the lithium titanate particles 12. The carbon source is not involved in the reaction. The carbon source molecules are evenly mixed with the produced $AlPO_4$, thus a substantially even thickness and continuous $AlPO_4$/carbon-source composite layer is formed on the surface of the lithium titanate particles 12. A molar ratio of the phosphate radicals to the $Al^{3+}$ or trivalent aluminum molecules can be in a range from about 1:1 to about 3:1. In one embodiment, the phosphate radical containing solution is dripped slowly into the pasty mixture while the pasty mixture is continuously stirred to thoroughly react the phosphate radicals with the $Al^{3+}$ or trivalent aluminum molecules. The reacted mixture is maintained continuously as a paste form by adding a proper amount of the first or second amount of organic liquid phase solvent during the process of adding the phosphate radical containing solution. In one embodiment, ethanol is added to maintain the reacted mixture as paste.

The step S3 can further include a step of separating the lithium titanate particles coated with the $AlPO_4$/carbon-source composite layer from the reacted mixture.

In one embodiment, the lithium titanate particles 12 coated with the $AlPO_4$/carbon-source composite layer are centrifugalized out from the reacted mixture. The solvent remained in the $AlPO_4$/Carbon-source composite layer can be removed by heat drying.

There are several purposes of heat treating in step S4. First, the liquid phase solvent and the reaction products except $AlPO_4$ (e.g., $NH_4NO_3$) after the step S3 can be removed. Second, the carbon source in the $AlPO_4$/carbon-source composite layer cracks to simple substance of carbon. Third, the simple substance of carbon and $AlPO_4$ are mutually combined to form an even thickness and continuous $AlPO_4$/C composite layer 14 wholly coated on the surface of the lithium titanate particles 12. The carbon source cannot crack at a low temperature, and a structure of the lithium titanate particles 12 may be destroyed at a high temperature. Therefore, an appropriate heat treating temperature is needed. Specifically, the heat treating temperature can be in a range from about 300° C. to about 700° C., and a time period for the heat treating can be in a range from about 0.5 hour to about 3 hours. In one embodiment, the heat treating temperature is about 400° C., and the time period for the heat treating is about 2 hours. A thickness of the $AlPO_4$/C composite layer 14 can be in a range from about 5 nm to about 15 nm.

The $AlPO_4$/C composite layer 14 of the lithium titanate composite material 10 can prevent the electron migration between the lithium titanate particles 12 and the electrolyte of the lithium ion battery as well as allow the lithium ions to pass therethrough. Therefore, a decomposition of the electrolyte or solvent can be avoided while lithium ions intercalate into and deintercalate out from the lithium titanate composite material 10 freely at a relatively low discharge voltage or a high charge voltage. Thus, the lithium titanate composite material 10 applied to the lithium ion battery can increase its electrochemical stability. Further, the carbon in the $AlPO_4$/C composite layer 14 improves electric conductivity of the lithium titanate composite material 10.

One embodiment of a lithium ion battery includes a cathode, an anode, and a non-aqueous electrolyte disposed between the cathode and the anode. The cathode includes a cathode current collector and a cathode material layer disposed on a surface of the cathode current collector. The cathode material layer includes a cathode active material. The anode includes an anode current collector and an anode material layer disposed on a surface of the anode. The anode material layer includes an anode active material, wherein the anode active material includes the lithium titanate composite material 10.

The cathode material layer further includes a conductive agent and a binder. The conductive agent and the binder are evenly mixed with the cathode active material. The cathode active material can be at least one of lithium cobalt oxide (e.g., $LiCoO_2$), spinel or layered lithium manganese oxide (e.g., $LiMn_2O_4$, or $LiMnO_2$), lithium iron phosphate (e.g., $LiFePO_4$), lithium nickel oxide (e.g., $LiNiO_2$), lithium nickel manganese oxide (e.g., $LiNi_{1/2}Mn_{1/2}O_2$), and lithium nickel cobalt manganese oxide (e.g., $LiNi_{1/3}CO_{1/3}Mn_{1/3}O_2$).

The anode material layer further includes the conductive agent and the binder. The conductive agent and the binder are evenly mixed with the lithium titanate composite material 10. The $AlPO_4$/C composite layer 14 may be entirely coated on the individual lithium titanate particle 12 in the lithium titanate composite material 10. The conductive agent can be at least one of graphite, olyvinylidene fluoride (PVDF), polytetrafluoroethylene (PTFE), and styrene-butadiene rubber (SBR). The non-aqueous electrolyte can be a non-aqueous electrolyte solution or a solid electrolyte film. The solid electrolyte film is disposed between the cathode material layer and the anode material layer when applied in the lithium ion battery. Lithium ion battery using the non-aqueous electrolyte solution can further include a separator disposed between the cathode material layer and the anode material layer. The non-aqueous electrolyte solution includes a solvent and an electrolyte salt dissolved in the solvent. The solvent of the non-aqueous electrolyte solution can be at least one of ethylene carbonate (EC), propylene carbonate (PC), ethylmethyl carbonate (EMC), diethyl carbonate (DEC), dimethyl carbonate (DMC), methyl acetate, ethyl acetate, propyl acetate, methyl propionate, ethyl propionate, γ-butyrolactone, tetrahydrofuran, 1,2-Dimethoxyethane, acetonitrile, and Dimethylformamide. The electrolyte salt can be at least one of lithium hexafluorophosphate ($LiPF_6$), lithium tetrafluoroborate ($LiBF_4$), and lithium bis(oxalato) borate (LiBOB). A material of the solid electrolyte film can be lithium iodide (LiI), lithium nitride ($LiN_3$), or a mixture of a polymer matrix and the electrolyte salt. The polymer matrix can be polyoxyethylene (PEO) or polyacrylonitrile (PAN).

The following example further illustrates the lithium titanate composite material and the method for making the lithium titanate composite material.

EXAMPLE

Approximately 1 g of Span® 80 is dissolved in about 100 ml of absolute ethanol to achieve a Span® 80 ethanol solution. The Span® 80 ethanol solution is added to the $Al(NO_3)_3$ ethanol solution (1 g of $Al(NO_3)_3$ dissolved in about 10 ml of ethanol) to form a mixed solution. The mixed solution is stirred during the process of adding the Span® 80 ethanol solution. Approximately 150 g of lithium titanate particles having a diameter of about 100 nm are added to the intensely stirred mixed solution to form a pasty mixture. Ethanol is dripped to the intensely stirred mixed solution to maintain the mixture as a paste form. $(NH_4)_2HPO_4$ water solution (1 g $(NH_4)_2HPO_4$ dissolved in about 2 ml of water) are then added to the pasty mixture to react with $Al(NO_3)_3$ in the paste. Ethanol is still added to insure the reaction appears in a pasty mixture. A molar ratio of the $(NH_4)_2HPO_4$ to $Al(NO_3)_3$ is about 1:1. After the $(NH_4)_2HPO_4$ water solution is mixed with the pasty mixture, the pasty mixture is put in the muffle furnace and heat treated for about 2 hours at 400° C. in air to achieve the lithium titanate composite material with a "core-shell" structure. The core is the lithium titanate particles. The shell is the AlPO$_4$/C composite layer. A thickness of the AlPO$_4$/C composite layer is about 10 nm.

The lithium titanate composite material fabricated by the method above is cycled in the lithium ion battery as an anode active material. Testing results show that the lithium titanate composite material has good electric conductivity, and the lithium ion battery still has good electrochemical stability when discharged to about 0 volt.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a lithium titanate composite material comprising:
   providing a trivalent aluminum source solution, a carbon source solution, and a plurality of lithium titanate particles;
   mixing the trivalent aluminum source solution, the carbon source solution, and the plurality of lithium titanate particles to form a pasty mixture;
   adding a phosphate radical containing solution into the pasty mixture to react with the trivalent aluminum source solution to form an AlPO$_4$/carbon-source composite layer coated on a surface of the plurality of lithium titanate particles, and
   heat treating the plurality of lithium titanate particles coated with the AlPO$_4$/carbon-source composite layer to transform the AlPO$_4$/carbon-source composite layer into an AlPO$_4$/C composite layer.

2. The method of claim 1, wherein the carbon source solution comprises a first amount of liquid phase solvent and a carbon source dissolved in the first amount of liquid phase solvent.

3. The method of claim 2, wherein the carbon source is at least one selected from the group consisting of sorbitan oleate or sorbitan (Z)-mono-9-octadecenoate, sucrose ester, phenolic resin, epoxy resin, furan resin, polyacrylonitrile, and polystyrene naphthalene.

4. The method of claim 2, wherein the first amount of liquid phase solvent is at least one selected from the group consisting of water, absolute ethanol, acetone, chloroform, diethyl ether, and dichloromethane.

5. The method of claim 2, wherein a concentration of the carbon source in the carbon source solution is in a range from about 0.005 g/ml to about 0.05 g/ml.

6. The method of claim 1, wherein the trivalent aluminum source solution comprises a second amount of liquid phase solvent and a trivalent aluminum source dissolved in the second amount of liquid phase solvent.

7. The method of claim 6, wherein the trivalent aluminum source is aluminum nitrate or aluminum isopropoxide.

8. The method of claim 1, wherein the mixing step further comprises:
   mixing the carbon source solution and the trivalent aluminum source solution to form an evenly mixed solution, and
   adding the lithium titanate particles to the mixed solution.

9. The method of claim 1, wherein a relationship between the amounts of the trivalent aluminum source solution, the carbon source solution, and the lithium titanate particles is represented by a equation of $1:30 \leq (V_{Al\text{-}source} + V_{C\text{-}solution}) : V_{Li_4Ti_5O_{12}} \leq 1:10$, wherein $V_{Al\text{-}source}$ represents a volume of the trivalent aluminum source solution, $V_{C\text{-}solution}$ represents a volume of the carbon source solution, and $V_{Li_4Ti_5O_{12}}$ represents a volume of the lithium titanate particles.

10. The method of claim 1, wherein the phosphate radical containing solution comprises water as a solvent and a phosphate radical source dissolved in the water, the phosphate radical source being at least one selected from the group consisting of phosphoric acid, triammonium phosphate, and ammonium dihydrogen phosphate diammonium hydrogen phosphate.

11. A method for making a lithium titanate composite material comprising:
   providing a trivalent aluminum source solution, a carbon source solution, and a plurality of lithium titanate particles;
   mixing the trivalent aluminum source solution, the carbon source solution, and the plurality of lithium titanate particles to form a mixture;
   adjusting amounts of the trivalent aluminum source solution, the carbon source solution, and the lithium titanate particles to form the mixture as a pasty mixture;
   adding a phosphate radical containing solution into the pasty mixture to react with the trivalent aluminum source solution to form an AlPO$_4$/carbon-source composite layer coated on a surface of the plurality of lithium titanate particles, and
   heat treating the plurality of lithium titanate particles coated with the AlPO$_4$/carbon-source composite layer to transform the AlPO$_4$/carbon-source composite layer into an AlPO$_4$/C composite layer.

12. The method of claim 11, wherein the carbon source solution comprises a first amount of liquid phase solvent and a carbon source dissolved in the first amount of liquid phase solvent; and the carbon source is sorbitan oleate or sorbitan (Z)-mono-9-octadecenoate.

* * * * *